(12) United States Patent
Narula et al.

(10) Patent No.: US 6,232,253 B1
(45) Date of Patent: May 15, 2001

(54) SOL-GEL ALUMINA MEMBRANE FOR LEAN $NO_x$ CATALYSTS AND METHOD OF MAKING SAME

(75) Inventors: Chaitanya Kumar Narula, Ann Arbor; Hung-Wen Jen, Troy; Haren Sarkarlal Gandhi, Farmington Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 08/311,298

(22) Filed: Sep. 23, 1994

(51) Int. Cl.[7] .................................................. B01J 20/28
(52) U.S. Cl. ............................ 502/4; 502/337; 502/338; 502/439
(58) Field of Search ............................ 502/41, 337, 338, 502/439

(56) References Cited

U.S. PATENT DOCUMENTS

| | | | |
|---|---|---|---|
| 4,699,892 | 10/1987 | Suzuki | 502/4 |
| 4,865,630 | * 9/1989 | Abe | 55/158 |
| 5,017,538 | 5/1991 | Takeshima | 502/64 |
| 5,100,596 | 3/1992 | Haag et al. | 264/42 |
| 5,155,077 | 10/1992 | Montreuil et al. | 502/66 |
| 5,183,788 | 2/1993 | Jacobson et al. | 502/4 |
| 5,210,062 | 5/1993 | Narula et al. | 502/304 |
| 5,250,184 | * 10/1993 | Maier | 210/653 |
| 5,258,339 | 11/1993 | Ma et al. | 502/4 |
| 5,275,795 | 1/1994 | Montreuil et al. | 423/212 |
| 5,342,431 | * 8/1994 | Anderson et al. | 95/45 |

FOREIGN PATENT DOCUMENTS

| | | |
|---|---|---|
| 3642018 | 6/1987 | (DE) . |
| 0425252 | 10/1990 | (EP) . |
| 0415410 | 3/1991 | (EP) . |

OTHER PUBLICATIONS

Database WPI—Week 9438, Derwent Publications Ltd., London, GB; AN 94–305359 & JP–A–06 205 940 (Wisconsin Alumni), Jul. 26, 1994, Abstract.

"Transition metal–promoted silica and alumina catalysts for the selective reduction of nitrogen monoxide with propane", by Hideaki Hamada et al., Elsevier Science Publications B.V., Amsterdam, Applied Catalysis, vol. 75, 1991, pp. L1–L8.

"Large Clusters and Colloids. Metals in the Embryonic State", by Günter Schmid, Chemical Reviews, vol. 92, No. 8, American Chemical Society, 1992, pp. 1709–1727.

"Alumina–supported silver catalysts for the selective reduction of nitric oxide with propene and oxygen–containing organic compounds", by Tatsuo Miyadera, Applied Catalysis B: Environmental, vol. 2, Elsevier Science Publishers B.V., Amsterdam, 1993, pp. 199–205.

"The relation between deactivation of CuZSM–5 in the selective reduction of NO and dealumination of the zeolite", by R.A. Grinsted et al., Zeolites, vol. 13, Nov./Dec., 1993, pp. 602–606.

"The Catalytic Implications of Lean Burn Engines: An Analysis of Factors Required to Meet Overall Emissions Requirements", by Karl C. C. Kharas et al., SAE Technical Paper #932762, pp. 147–156.

* cited by examiner

*Primary Examiner*—Walter D. Griffin
(74) *Attorney, Agent, or Firm*—Sangeeta G. Shah

(57) ABSTRACT

A lean-$NO_x$ catalyst having a sol-gel processed membrane. The sol-gel processed membrane is loaded with a transition metal. Methods are also disclosed for loading a transition metal on the membrane and reducing emissions in an exhaust stream to provide a $NO_x$ reduction system which can operate in a broad range of operating conditions.

12 Claims, 3 Drawing Sheets

SOL-GEL ALUMINA MEMBRANE FOR LEAN $NO_X$ CATALYSTS AND METHOD OF MAKING SAME

TECHNICAL FIELD

This invention relates to lean-$NO_x$ catalysts, particularly those providing a high surface area catalyst membrane of controlled pore size to remove nitrogen oxide ($NO_x$) emissions from lean-burn automobile engines and industrial plants emission systems. The present invention also discloses a method of making such catalysts.

BACKGROUND OF THE INVENTION

The Environmental Protection Agency has instituted stringent automobile-related environmental regulations. A primary focus of the regulation relates to the Corporate Average Fuel Economy (CAFE) standards, which mandate a specified, gradual increase of a corporate fleet's overall fuel economy by the established target dates. CAFE standards have spurred industry wide research and development of "lean-burn engines". The term "lean-burn engine" used herein is defined as an engine utilizing air/fuel mixtures having an oxygen content in excess of the stoichiometric air/fuel ratio (lean mixtures). The use of such lean air/fuel mixtures, reduces the consumption of fuel and thus enhances an automobile's fuel economy. The effort to increase automobile fuel economy has become paramount in the wake of the Environmental Protection Agency's tightening CAFE standards.

In addition to the CAFE standards, the Environmental Protection Agency has set a schedule for the continual reduction of specific automotive emissions. Thus, the Environmental Protection Agency's regulatory measures have required the automobile industry to simultaneously increase fuel economy while decreasing harmful exhaust emissions. Accordingly, there exists a new found interest in the development of a catalyst to operate efficiently under lean-burn conditions.

Many of the prior art catalysts were designed to optimally operate at or about stoichiometric conditions. These prior art catalysts when combined with a lean fuel mixture result in $O_2$ being adsorbed by the catalyst, preventing $NO_x$ from being reduced to nitrogen ($N_2$) by the active metal on the catalyst. So while the current three-way catalyst, for example, may effectively reduce NO, hydrocarbons (HC) and CO emissions at stoichiometric conditions, the efficiencies of a three-way catalyst for $NO_x$ reduction diminish significantly in an oxygen rich environment.

The effectiveness of a catalyst is largely dependent on the air/fuel ratio of the fuel mixture which is employed in an engine. If a lean mixture is utilized, a catalyst exhibits a high activity of oxidation but a low activity of reduction, while the combustion product contains a large amount of oxygen. In contrast, in the presence of a fuel rich mixture, a catalyst exhibits a high activity of reduction but a low activity of oxidation. At stoichiometric air/fuel ratios, oxidation and reduction are balanced.

Accordingly, there is a need for a lean-$NO_x$ catalyst which efficiently reduces $NO_x$ emissions in the presence of a lean fuel mixture. In addition to automotive applications, lean-$NO_x$ catalysts are also valuable in lowering the emissions of stationary power plants that burn fossil fuels. A lean-$NO_x$ catalyst is defined for purposes of this application as a catalyst that can reduce $NO_x$ under lean-burn conditions.

In answer to this problem, transition metal-containing zeolite catalysts have been developed to reduce $NO_x$ emissions for lean mixtures. In particular, copper-zeolite catalysts have been preferred due to the effectiveness of copper as an ion exchange metal at lower temperatures such as that present in lean-burn engine exhaust.

Zeolites are crystalline aluminosilicates. Zeolites are commercially available and are characterized by crystal structures having different channels or pore diameters. Zeolites have fine pores (sized at several angstroms), comparable with the size of a molecule, hence they are termed molecular sieves. It is believed that the hydrocarbons are selectively trapped in those pores or sieves. As the transition metal, introduced by ion exchange, forms active sites in the pores, the hydrocarbons are adsorbed therein and react with nitrogen oxides in the presence of excess $O_2$. Accordingly, zeolite catalysts have potential application in the removal of $NO_x$ from lean fuel mixtures.

The basic principle behind removing $NO_x$ in a lean fuel mixture with a transition metal, e.g., copper, copper-containing zeolite catalyst relies on adsorbing $NO_x$ and effectuating a catalytic reaction of the adsorbed $NO_x$ with the hydrocarbons contained in the exhausted gas, to reduce the $NO_x$ to $N_2$. Although copper-zeolite catalysts have good catalytic activity initially, due to copper's high $NO_x$ adsorption ability, copper-zeolite catalysts have a series of limitations which are described below.

First, transition metal containing zeolites degrade at high temperatures usually found in automotive exhaust systems. Furthermore, if the zeolite catalyst is exposed to steam-containing air, e.g., automotive exhaust, the activity of the catalyst decreases rapidly. The decrease in activity is also accompanied by dealumination. Steam deactivation of zeolite-based catalysts is the primary reason why such catalysts are not practical in application.

To compensate for the problems associated with zeolites, alumina ($Al_2O_3$) has been used in three-way catalysts as support for active ingredients. The use of $Al_2O_3$ and metal containing $Al_2O_3$ as lean-$NO_x$ catalysts has been reported by H. Hamada, Y. Kintaichi, M. Sasaki and T. Ito in "Transition metal-promoted silica and alumina catalysts for the selective reduction of nitrogen monoxide with propane", *Applied Catalysts*, L1–L8 (1991). Alumina, however, is inefficient in $NO_x$ reduction such that it is currently impractical for commercial use.

Thus, a need exists for a commercially practical, efficient, lean-$NO_x$ catalyst as provided by the present invention.

SUMMARY OF THE INVENTION

The present invention teaches a catalyst for reducing emissions from an oxygen-rich environment which includes: a sol-gel processed inorganic membrane and a transition metal loaded on the sol-gel processed membrane.

The present invention also discloses methods for preparing a sol-gel processed alumina membrane and sol-gel processed alumina/silica membrane for use with lean-$NO_x$ catalysts.

The invention additionally discloses a method of loading a transition metal onto a sol-gel processed membrane for catalytic $NO_x$ reduction for lean-burn engines.

Further, the present invention teaches a $NO_x$ reduction system for catalytic reduction under lean-burn conditions in an automobile exhaust stream which combines a lean-$NO_x$ catalyst, particularly the aforesaid alumina/silica sol-gel catalyst, with a three-way catalyst to provide an emission system which can operate over a broad range of operating conditions.

The instant invention has many advantages. First, the sol-gel process provides inorganic membranes which have customized pore sizes. This flexibility allows the inorganic membranes to in effect mimic the effectiveness of the zeolite pore structure. Second, alumina/silica membranes retain high surface area even after high temperature treatment. Third, these alumina/silica membranes are thoroughly stable high surface area membranes. The resulting catalyst membrane can thereby have significantly increased hydrothermal stability and consequent improved performance.

These and other features and advantages of the present invention are readily apparent from the detailed description of the best mode for carrying out the invention when taken in conjunction with the accompanying drawings.

BRIEF DESCRIPTION OF THE DRAWINGS

FIG. 3 depicts three embodiments of an emission reduction system;

BEST MODE FOR CARRYING OUT THE INVENTION

Figure 1:
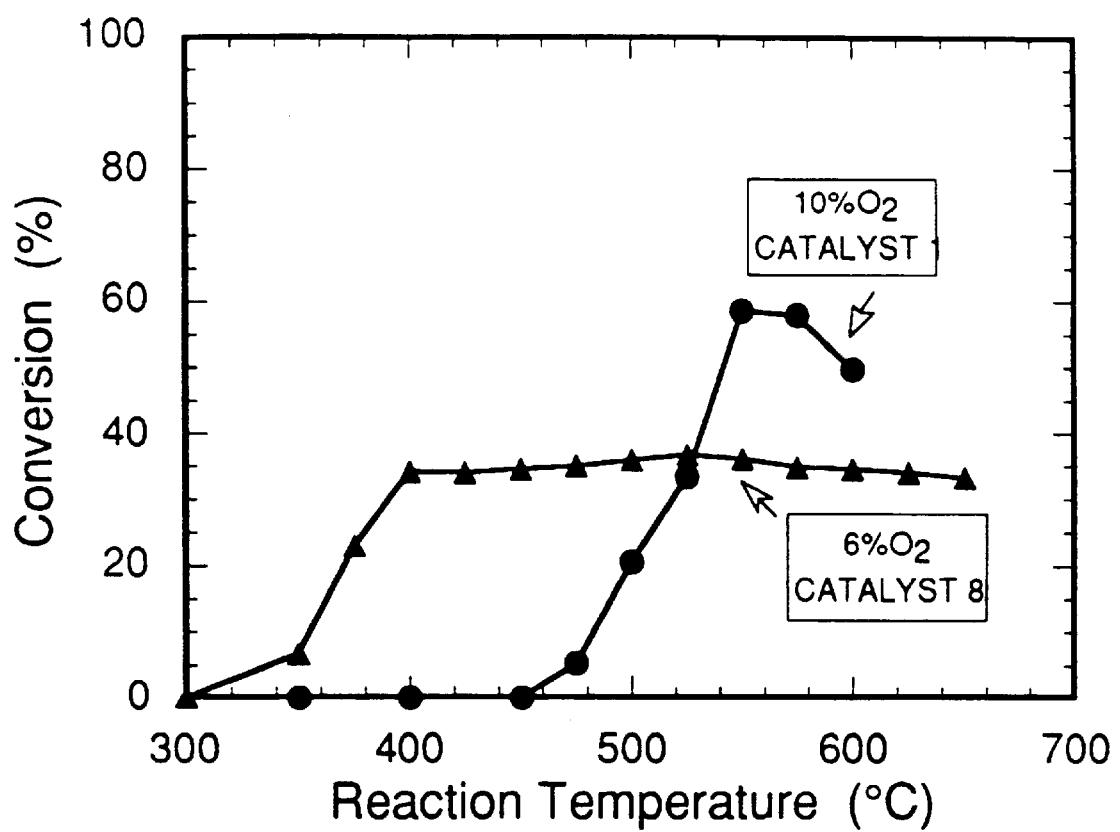
FIG. 1 is a graphic comparison of NO conversion efficiency between a Ag-containing-sol-gel processed membrane catalyst and a Cu/ZSM-5 catalyst.

Zeolite membranes are characterized by their crystalline structure. In contrast, sol-gel processed alumina membranes or sol-gel processed alumina/silica membranes are amorphous unless sintered at high temperature and are prepared from a sol composition, i.e., a liquid colloidal dispersion. A sol in this case is a gel which comprises highly cross-linked inorganic polymers. A sol can be converted to gel by several known methods such as concentrating the sol, heating or cooling the sol. These alumina sols can be employed to prepare alumina membranes for use on ceramic monoliths for catalysts [C. K. Narula, et al., U.S. Pat. No. 5,210,062, May 11, 1993].

In the preferred embodiment, alumina sols were prepared by hydrolyzing aluminum alkoxides in water followed by peptization in the presence of dilute mineral acid. The silica sol was concentrated to a gel which was then heated at 250° C. and 600° C. in a nitrogen atmosphere. The sol was prepared from Si $(EtO)_4$ in ethanol, water and dilute mineral acid. Alumina membranes which were then prepared from alumina sols showed a surface area of 230 $m^2$/grams and pore size of 45 angstroms after heating at 600° C.

Alumina/silica membranes were prepared from a mixture of alumina and silica sol and aging at 600° C. showed a surface area of 390 $m^2$/grams and pore size of 45 angstroms. Alumina/silica membrane prepared by treating alumina membranes with silica sol show pore sizes of 30 and 40 angstroms. In another embodiment, alumina/silica materials were prepared from $(tBuO)_3$ Si—O—$Al(OR)_2$ and $Al(OR)_3$ in parent alcohol. These materials also retained high surface area after aging at 1100° C. in air.

A transition metal was loaded onto the membrane by dissolving a water soluble, transition metal containing salt in distilled water to form a transition metal containing solution; impregnating the transition metal containing solution on the membrane, where the membrane is sol-gel processed, which includes the following steps: mixing the membrane and the transition metal containing solution to form a mixture; stirring the mixture; evaporating water from the mixture to form a paste; drying the paste to form a dried sample; and calcining the dried sample. Transition metal as used herein includes copper, cobalt, nickel, chromium, iron, manganese, silver, zinc, calcium and compatible mixtures thereof; transition metal includes the elemental metal itself in addition to its metal oxide.

In the preferred embodiment for impregnation of the metal on the membrane surface, the use of silver was preferred. The silver was impregnated on the membrane by mixing the membrane material and the impregnation solution ratio=1 gram:1.8 milliliters stirring the mixture, and slowly evaporating water until the mixture turns paste. The impregnating solution contained the known amount of silver nitrate and 5–10 volume percent of concentrated nitric acid. The paste was then dried at 50° C. overnight and for at least 4 hours at 120° C. The dried sample was finally calcined at 550° C. for 4 hours. The efficiency for lean-$NO_x$ reduction was measured under a model reaction condition. A result showed that 80% NO was reduced to nitrogen at 450° to 525° C.

The ratio of the amount of transition metal to the weight of the sol-gel processed membrane is dependent on the desired transition metal loading on the sol-gel processed material. When the transition metal is silver, the amount of silver supported on the membrane is generally in the range of 1–8 weight percent of the overall weight. Generally, however, the amount of the transition metal is in the range of 1–20 weight percent of the overall weight.

The sol-gel processed alumina preferably has a pore size distribution in the range of 20–60 angstroms. As a result of this ability to control the porosity of the membrane, silver or any other transition metal deposited in these pores has a high surface area, resulting in a membrane with high activity.

Alumina sols were prepared by hydrolyzing aluminum alkoxides (e.g. $Al(OBu^s)_3$) in water followed by peptization in the presence of diluted mineral acid. The sol was then concentrated to gel which was then heated at 250° C. and 600° C. in a nitrogen atmosphere. Alumina/silica membranes were prepared from a mixture of aluminum sol and silica sol which was obtained from $Si(EtO)_4$ in ethanol, water, and diluted mineral acid. A sample of alumina/silica membrane was made with uniform pore size around 45 Å and 390 $m^2$/g. Two samples of sol-gel processed alumina membrane, SG1 (195 $m^2$/g and 40 Å-pore) and SG2 (224 $m^2$/g and 39 Å-pore), were used in the following disclosure.

Ag-containing salts such as $AgNO_3$ which is water soluble were dissolved in distilled water. The Ag-solution was then used to impregnate the sol-gel processed membrane material. The ratio of the Ag amount to the membrane weight was dependent on the desired Ag loading on the sol-gel processed material. After the impregnation, the material was dried up to 120° C. and then heated in air inside a furnace at 500–600° C. for 4 hours.

EXAMPLES

The present invention will now be further illustrated by, but in no way limited to the following examples. In the examples listed, unless otherwise indicated, all percents are percents by weight and temperatures cited are in degrees Celsius.

ZSM-5, as herein referred to, is a type of zeolite. ZSM-5 is a trademark of Mobil Corporation. It is a siliceous zeolite with a high ratio of $SiO_2$ to $Al_2O_3$ and a high acid strength. ZSM-5 has rings of 10 oxygen atoms, it contains very little water of crystallization, is hydrophobic and has a few acid sites.

Example 1

For CATALYST 1, 2 grams of SG2 (sol-gel processed $Al_2O_3$) powder was added into a Ag-containing solution which was made of 0.8 ml solution of $4.95 \times 10^2$g Ag/ml, 0.25 ml of concentrated $HNO_3$, and 1.85 ml distilled water. Under constant stirring, water was slowly evaporated till the mixture of the powder and the solution turned into paste. The paste was then dried at 120° C. overnight and heated at 500° C. for 4 hours.

Example 2

For CATALYST 2, 2 grams of SG1 powder was used. The solution used for impregnation was the same as that for CATALYST 1. The procedure of preparation was also the same as that for CATALYST 1.

Example 3

For CATALYST 3, a sample of CATALYST 2 that was prepared according to the procedure above went through the same impregnation and heating steps again. The resulted loading of Ag on CATALYST 3 was two times of that for CATALYST 2.

Example 4

For CATALYST 4, 0.89 gram of CATALYST 1 was added into a solution which was made of 1 ml solution of 0.0178 g Ag/ml and 0.3 ml of distilled water. The water was slowly evaporated till paste was formed. The paste was dried at 110° C. for 2 hours. The dried material was again impregnated with the same solution. After drying at 100° C., the sample was heated in air at 525° C. for 3 hours.

Example 5

For CATALYST 5, 0.91 gram of SG1 was added into a solution which was made of 0.511 ml of 0.0178 g Ag/ml solution and 0.8 ml distilled water. Following the slow evaporation of water, the resulted paste was dried at 110° C. and finally heated in air at 525° C. for 3 hours.

Example 6

For CATALYST 6, 10 grams of commercially available $\gamma$-$Al_2O_3$ used for TWC was added into 15 ml solution containing 0.2066 gram Ag and 0.5 ml concentrated $HNO_3$. Under constant stirring, the water was evaporated slowly and the resulted paste was dried at 100° C. for 1 hour, 250° C. for 1 hour, and finally at 500° C. for 5 hours. This catalyst represents the preferred Ag-catalyst using this type of $Al_2O_3$.

Example 7

For CATALYST 7, 2 grams of SG2 was added into a solution made of 1.6 ml of 0.0246 g Cu/ml solution, 0.25 ml of concentrated $HNO_3$, and 1.65 ml distilled water. After the slow evaporation of water, the material was dried at 120° C. and then heated in air at 500° C. for 4 hours. This catalyst is Cu-containing sol-gel $Al_2O_3$.

Example 8

CATALYST 8 was a commercially available Cu/ZSM-5 catalyst with Si/Al ratio=19 and 2.9 weight % of Cu. The sample was prepared by a typical ion-exchange method using Cu(II)-acetate and H-ZSM-5 zeolite (Table 1). The obtained sample was heated in air at 550° C. for 4 hours.

The efficiency was measured under model reaction conditions: 1–10% $O_2$, 500–1500 ppm $C_3H_6$, 1000 ppm NO, and space velocities equivalent to 12,500–50,000 $hr^{-1}$. Table 2 shows that CATALYST 1 could reduce NO in range of 3–10% $O_2$. Under the same reaction conditions, the efficiency of CATALYST 6 prepared from the commercially available $\gamma$-$Al_2O_3$ was generally lower than that of CATALYST 1. The efficiencies of CATALYST 1 at different space velocities are shown in Table 3. The NO-reduction efficiency changed slightly in the range of $O_2$-concentration or space velocity applied above. The effect of $C_3H_6$-concentration was shown in Table 4. Table 5 shows that CATALYST 7, Cu-containing SG2, can reduce NO at lower temperature than Ag/SG1 or Ag/SG2 under the same conditions.

The efficiencies in Table 6 were measured at the conditions similar to those in A above, except that $C_3H_6$ was replaced by a mixture of $C_3H_6$ and $C_3H_8$ with the ratio of $C_3H_6/C_3H_8=2$ which represents the ratio of saturated hydrocarbons to olefins in the automobile exhaust. The maximum efficiencies for CATALYST 1–5 with Ag loading from 1 to 6 weight % are shown in Table 6 along with the activities of CATALYST 6 and CATALYST 8. Most Ag/sol-gel processed $Al_2O_3$ catalysts had larger activities of NO-reduction.

TABLE 1

LIST OF CATALYSTS
Metal Used

| Catalyst No. | Type | Weight % | Support |
|---|---|---|---|
| 1 | Ag | 2 | SG2 |
| 2 | Ag | 2 | SG1 |
| 3 | Ag | 4 | SG1 |
| 4 | Ag | 6 | SG2 |
| 5 | Ag | 1 | SG1 |
| 6 | Ag | 2 | $\gamma$-$Al_2O_3$ |
| 7 | Cu | 2 | SG2 |
| 8 | Cu | 2.9 | H-ZSM5 |

TABLE 2

NO-CONVERSION AT DIFFERENT LEVEL OF $O_2$
(1000 ppm NO, 500 ppm, $C_3H_6$, equivalent space velocity = 5,000 $hr^{-1}$)

| CATALYST | $O_2$(%) | T(° C.) | NO-Conversion (%) |
|---|---|---|---|
| CATALYST 1 | 3 | 525 | 52.2 |
|  | 6 | 500 | 54.4 |
|  | 10 | 500 | 46.2 |
| CATALYST 6 | 3 | 575 | 31.1 |
|  | 6 | 550 | 33.6 |
|  | 10 | 500 | 34.2 |

TABLE 3

NO-CONVERSION OVER CATALYST 1 AT DIFFERENT
SPACE VELOCITY
(1000 PPM NO, 1500 PPM $C_3H_6$, 10% $O_2$)

| Equivalent Space Velocity | T(° C.) | NO-Conversion (%) |
|---|---|---|
| 25,000 hr$^{-1}$ | 500 | 83.8 |
| 50,000 hr$^{-1}$ | 500 | 76.9 |

TABLE 4

EFFECT OF $C_3H_6$-CONCENTRATION
(1000 ppm NO, 10% $O_2$, equivalent space
velocity = 25,000 hr$^{-1}$)

| $C_3H_6$-Concentration (ppm) | T(° C.) | NO-Conversion (%) |
|---|---|---|
| 500 | 500 | 46.2 |
| 1500 | 500 | 83.8 |

TABLE 5

NO-CONVERSION OVER CATALYST 7
(1000 ppm NO, 1500 ppm $C_3H_6$, equivalent space
velocity = 25,000 hr$^{-1}$)

| $O_2$(%) | T(° C.) | NO-Conversion (%) |
|---|---|---|
| 1 | 475 | 69.2 |
| 3 | 450 | 54.8 |

TABLE 6

NO-EFFICIENCY COMPARISON
(1,000 ppm NO, 1500 ppm $C_3H_6$, equivalent space
velocity = 25,000 hr$^{-1}$)
CATALYST

| No. | Description | $O_2$(%) | T(° C.) | NO-Conversion (%) |
|---|---|---|---|---|
| 5 | 1 wt % Ag/SG1 | 10 | 525 | 91.6 |
| 2 | 2 wt % Ag/SG1 | 10 | 500 | 96.7 |
| 3 | 4 wt % Ag/SG1 | 10 | 475 | 98.7 |
| 4 | 6 wt % Ag/SG2 | 10 | 450 | 44.8 |
| 1 | 2 wt % Ag/SG2 | 10 | 500 | 95.0 |
| 6 | 2 wt % Ag/$\gamma$-$Al_2O_3$ | 10 | 500 | 62.6 |
| 8 | 2.9 wt % Cu/ZSM5 | 6 | 550 | 62.8 |

Figure 2:
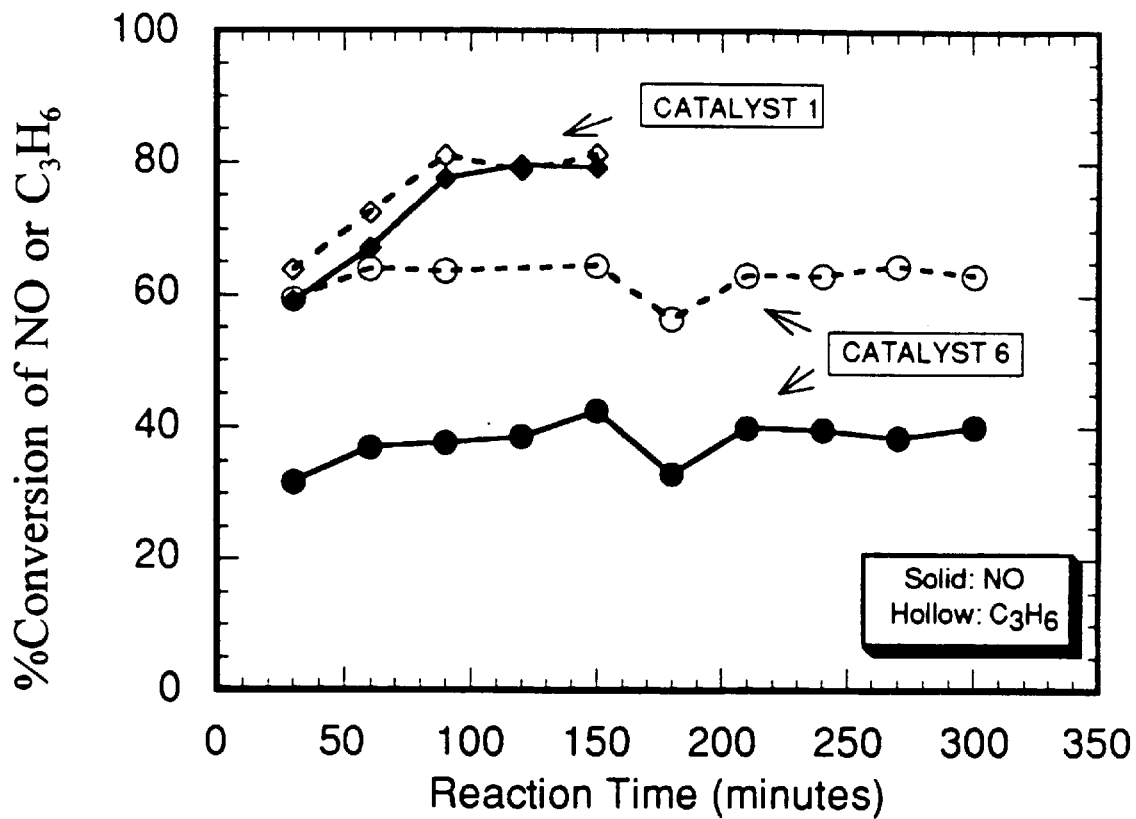
FIG. 2 is a graphic comparison of NO conversions between a Ag-containing-sol-gel processed membrane catalyst and a commercially available Ag on $\gamma$-$Al_2O_3$ catalyst.
Figure 3A:
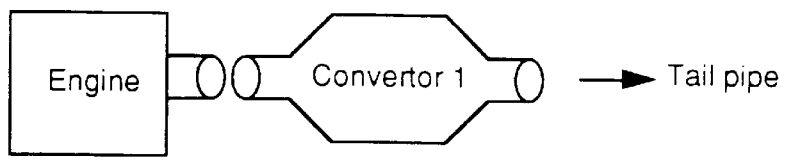
FIG. 3A depicts a catalyst containing a Ag/sol-gel processed $Al_2O_3$ membrane.
Figure 3B:
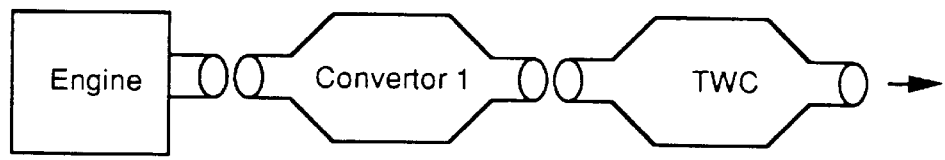
FIG. 3B depicts an emission system having a combination of a Ag/sol-gel processed $Al_2O_3$ catalyst with a three-way catalyst (TWC)
Figure 3C:
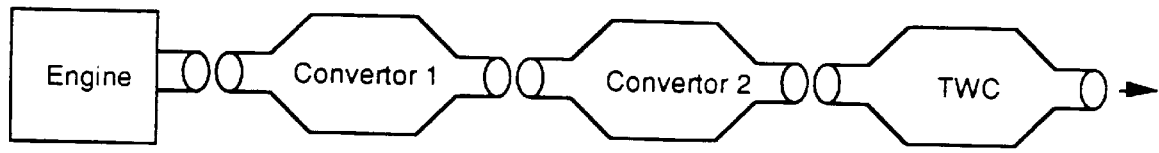
FIG. 3C depicts an emission system having a combination of two lean-$NO_x$ catalysts, a Ag/sol-gel processed $Al_2O_3$ catalyst and a zeolite catalyst, in conjunction with a three-way catalyst (TWC).

In a simulated exhaust mixture containing 9% $H_2O$ and 18 ppm $SO_2$ 1000 ppm NO, 1515 ppm $C_3H_6$ and 25,000 hr$^{-1}$, the efficiency of NO-reduction for CATALYST 1 was higher than that for CATALYST 6 (Ag on commercial $\gamma$-$Al_2O_3$ or CATALYST 8 (commercial Cu/ZSM-5) as shown in FIG. 1. At 550° C. and in the presence of 9% $H_2O$ and 18 ppm $SO_2$ 1000 ppm NO, 950 ppm $C_3H_6$, 520 ppm $C_3H_6$ and 0.51 min$^{-1}$ the NO-reduction efficiency for CATALYST 1 did not decrease along with time and was higher than that for CATALYST 6 as shown in FIG. 2.

Catalytic applications using the disclosed sol-gel processed membrane include: 1) Using such a catalyst in stationary power plants and 2) Using a catalyst having a sol-gel processed membrane in conjunction with a three-way catalyst to allow dual catalytic converters to provide comprehensive emission reductions at a broad range of operating temperatures.

The three-way catalyst performs effectively at stoichiometric air/fuel ratio to reduce $NO_x$ in the lower temperature ranges. Fresh Cu ZSM-5 zeolite catalyst is best suited to operate on the 280–400° C. range temperature at lean conditions. Likewise, the sol-gel processed catalytic converter works efficiently for $NO_x$ reduction at lean conditions in the 400–550° C. temperature range. In application, the combination provides comprehensive conversion efficiency for the reduction of automobile emissions.

For example, one such $NO_x$ reduction system for lean-burn conditions in an automobile exhaust stream, having an upper end near the engine and a lower end near the tail pipe, includes at least one inorganic membrane-based, lean-burn catalyst positioned at the upper end of the exhaust stream which has sol-gel processed membrane, and a transition metal loaded on the substrate; and a three-way catalyst positioned at the lower end of the exhaust stream to provide a system which can operate in a broad range of temperatures.

Preferably, the above system would include the step of providing control means for routing exhaust to each group of catalytic converts depending on the air/fuel ratio present. Thus, if the air/fuel ratio is in excess of stoichiometric conditions (14.6) then the exhaust stream should be routed through the inorganic membrane-based lean-$NO_x$ catalysts which may be used in conjunction with the copper ZSM-5 lean-$NO_x$ catalyst, which would be placed at the lower end of the exhaust stream. In addition, depending on the particular set of operating conditions, an oxidation catalyst can also be added to remove any remaining hydrocarbons which may be present in the emission stream. On the contrary, if the air/fuel ratio is fuel rich or less than 14.6 than the exhaust stream should be routed through a three-way catalyst.

The above system provides an emission reduction system to cover an automobile's varying air/fuel ratio and a spectrum of operating temperatures while still effectively reducing HC, CO and $NO_x$ emissions from an exhaust stream.

While the best mode for carrying out the invention has been described in detail, those familiar with the art to which this invention relates will recognize various alternative designs and embodiments for practicing the invention as defined by the following claims.

We claim:

1. A catalyst for reducing emissions from an oxygen rich environment, comprising:
   a sol-gel processed membrane; and
   a transition metal loaded on said membrane wherein said transition metal is selected from the group consisting of Fe, Cu, Co, Cr, Ag, Ni, Mn, Zn, Ca, and mixtures thereof.

2. The catalyst of claim 1, wherein said membrane is selected from the group consisting of alumina, silica and alumina/silica.

3. The catalyst of claim 1, wherein said membrane has a pore size distribution in the range of 20–60 Å.

4. The catalyst of claim 1, wherein the amount of said transition metal is in the range of 1–20 weight percent of the overall weight.

5. A method of loading a membrane for $NO_x$ reduction of lean-burn engines, comprising:
   dissolving a water soluble, transition metal containing salt in distilled water to form a transition metal containing solution, wherein said transition metal is selected from the group consisting of Fe, Cu, Co, Cr, Ag, Ni, Mn, Zn, Ca, and mixtures thereof;

impregnating said transition metal containing solution on the membrane, wherein the membrane is sol-gel processed, which comprises:
- mixing the membrane and said transition metal containing solution to form a mixture;
- stirring said mixture;
- evaporating water from said mixture to form a paste;
- drying said paste to form a dried sample; and
- calcining said dried sample.

6. The method of claim 5, wherein the membrane is selected from the group consisting of alumina, silica and alumina/silica.

7. The method of claim 5, wherein the membrane has a pore size distribution in the range of 20–60 Å.

8. The method of claim 5, wherein the amount of said transition metal supported on the membrane is in the range of 1–20 weight percent.

9. The method of claim 5, wherein said transition metal is silver.

10. The method of claim 9, wherein the amount of said silver supported on the membrane is in the range of 1–8 weight percent of the overall weight.

11. The method of claim 5, wherein said paste is dried at about 50° C. for about 8 hours and dried again for at least 4 hours at about 120° C. to form said dried sample.

12. The method of claim 5, wherein said dried sample is calcined for about 4 hours at a temperature of about 550° C.

* * * * *